United States Patent
King (10) Patent No.: US 10,716,302 B2
(45) Date of Patent: Jul. 21, 2020

(54) ENVIRONMENTALLY SAFE INSECT CONTROL SYSTEM

(71) Applicant: University of Central Florida Research Foundation, Inc., Orlando, FL (US)

(72) Inventor: Joshua King, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 567 days.

(21) Appl. No.: 15/165,104

(22) Filed: May 26, 2016

(65) Prior Publication Data

US 2016/0345572 A1    Dec. 1, 2016

Related U.S. Application Data (60) Provisional application No. 62/166,290, filed on May 26, 2015.

(51) Int. Cl.
*A01M 7/00*    (2006.01)

(52) U.S. Cl.
CPC ........ *A01M 7/0025* (2013.01); *A01M 7/0042* (2013.01)

(58) Field of Classification Search
CPC ... A01M 7/0014; A01M 7/0042; A01M 19/00
See application file for complete search history.

(56) References Cited

U.S. PATENT DOCUMENTS

| | | | | |
|---|---|---|---|---|
| 5,031,355 A | * | 7/1991 | Ryan | A01M 19/00 43/130 |
| 5,319,878 A | * | 6/1994 | Moffett | A01M 1/2094 43/124 |
| 5,366,154 A | * | 11/1994 | Thompson | A01M 7/0042 239/13 |
| 5,501,032 A | * | 3/1996 | Pitman | A01M 17/002 43/129 |
| 6,026,609 A | * | 2/2000 | Rawls | A01M 1/2094 43/124 |
| 2009/0249962 A1 | * | 10/2009 | Westra | A47J 31/52 99/323.3 |
| 2012/0066961 A1 | * | 3/2012 | Schuster | A01M 1/2094 43/132.1 |

OTHER PUBLICATIONS

Ascunce, M., et al., Global invasion history of the fire ant *Solenopsis invitca*, "science mag." pp. 1066-1068, vol. 331 (2011).

(Continued)

*Primary Examiner* — Jessica B Wong
(74) *Attorney, Agent, or Firm* — Timothy H. Van Dyke; Beusse, Wolter, Sanks & Maire PLLC (57) ABSTRACT

Disclosed herein is an insect control system that involves injection of hot liquid (e.g. water or other ecologically suitable liquid) into a mound or nest of target insects. The system includes a tank, a heating component, a hose, a pump and an injector component. The system may further include an actuator to control release of hot liquid through the injector component as well as components to keep the operator safe from hot liquid. Typically, the tank will hold a volume of liquid and the system heats the liquid to about 150° F. or more.

11 Claims, 4 Drawing Sheets

(56) References Cited

OTHER PUBLICATIONS

Barr, C., et al., Broadcast baits for fire ant control, "sotuhern IPM center", pp. 1-9 (2005).
Collins, H., et al., Seasonal trends in effectiveness of hydramethylnon (AMDRO) and Fenoxycarb (LOGIC) for control of Red imported fire ants (Hymenoptera: formicidae), "J. Economic Entomology", pp. 2131-2137, vol. 85, Issue 6 (1992).
Cook, J., Conservation of biodiversity in an area impacted by the red imported fire ant, Solenopsis invicta (hymenoptera: formicidae), "biodiversity and conservation", pp. 187-195, vol. 12 (2003).
Drees, B., Estimated amounts of insecticide ingredients used for imported fire ant control using various treatment approaches, "Texas A&M university system" pp. 1-10 (2003).
Drees, B., et al., Integrated pest management concepts for red imported fire ants Solenopsis invicta (hymenoptera: formicidae)., "Insect science", pp. 429-438, vol. 20 (2013).
Drees, B., Development of integrated pest management programs for the red imported fire ant (hymenoptera: formicidae), "J. Entomological science", pp. 170-180, vol. 38, Issue 2 (2003).
Hamman, P., et al., Fire Ants and their control, "Texas Agricultural extension service", pp. 1-10 (1986).
King, J., Tschinkel, W., Experimental evidence that the introduced fire ant, Solenopsis invicta, does not competitively suppress co-occuring ants in a disturbed habitat, "J. Animal Ecology", pp. 1370-1378, vol. 75 (2006).
King, J., A rapid non-toxic system for control of fire ants along Florida beaches with a special emphasis on Fort De Soto Park Pinellas County Florida, "Programmatic report", pp. 1-2 (2016).
Lard, C., et al., The statewide economic impact of red imported fire ants in texas: a part of the texas fire ant initiative, "Texas A&M university", pp. 1-8 (2001).
Lard, C., et al., Economic assessments of red imported fire ant on texas urban and agricultural sectors, "Southwestern entomologist", pp. 123-137 (2002).
Mcnaught, M., et al., Effect of broadcast baiting on abundance patterns of red imported fire ants (hymenoptera: formicidae) and key local ant genera at long-term monitoring sites in brisbane australia, "j. economic entomology", pp. 1307-1315, vol. 107, Issue 4 (2014).
Morrison, L., Porter, S., Testing for Population-level impacts of introduced pseudacteon tricuspis flies, phorid of Solenopsis invicta fire ants, "Biological Control", pp. 9-19, vol. 33 (2005).
Pimentel, D., Update on the enviornmental and economic costs associated with alien-invasive species in the US, "Ecological Economics", pp. 273-288, vol. 52 (2005).
Porter, S., Fire Ant mound densities in the US and brazil (hymenoptera: formicidae), "J. Econ. Entomol.", pp. 1154-1161 (1992).
Stimac, J., Alves, S., Ecology and biological control of fire ants, "Pest management in the subtropics", pp. 353-380 (1994).
Tschinkel, W., Howard, D., A Simple non-toxic home remedy against fire ants, "J. Georgia Entomol. Soc.", pp. 102-105, vol. 15 (1980).
Tschinkel, W., King, J., Targeted removal of ant colonies in ecological experiments using hot water, "J. Insect science", pp. 1-12, vol. 7 (2007).

* cited by examiner

ENVIRONMENTALLY SAFE INSECT CONTROL SYSTEM

BACKGROUND

Fire ants are an ecological and financial disaster in Texas as well as other states in the Southern United States. These pests upset and destroy natural ecosystems, are considered a threat to public health, and have detrimental economic effects in agriculture (large mounds damage machinery), ranching (loss of newborn livestock), and recreation and tourism (loss of game birds and rendering park and resort areas uncomfortable at best).

A specific problem of fire ant control is how one should control or eliminate fire ants and other insect species without damaging the environment. Presently, the art includes the various methods of fire ant control. Chemical poisons, such as AMDRO are well known in the art and are used frequently. Such poisons, however, may pollute the environment, and indiscriminately eliminate native species as well as foreign species.

Thus, it has been discovered that the prior art is deficient in a pest eradication product which is environmentally sound and specifically targets and eliminates only target insect species, such as imported fire ants.

BRIEF DESCRIPTION OF THE DRAWINGS

The following drawings form part of the present specification and are included to further demonstrate certain embodiments of the present disclosure. The disclosure may be better understood by reference to one or more of these drawings in combination with the detailed description of specific embodiments presented herein.

GENERAL TERMS

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item.

The terminology used herein is for the purpose of describing particular embodiments only and is not intended to be limiting. As used herein, the singular forms "a," "an," and "the" are intended to include the plural forms as well, unless the context clearly indicates otherwise these terms do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising."

The term "about" or "approximately" is meant to denote up to a 5, 6, 7, 8, 9, or 10 percent variance in the stated value or range. For example, about 2 includes values of 1.9 to 2.1.

DETAILED DESCRIPTION

Disclosed herein is an insect control system that involves injection of hot liquid (e.g. water or other ecologically suitable liquid) into a mound or nest of target insects. The system includes a tank, a heating component, a hose, a pump and an injector component. The system may further include an actuator to control release of hot liquid through the injector component as well as components to keep the operator safe from hot liquid. Typically, the tank will hold a volume of liquid and the system heats the liquid to about 150° F. or more. In a more specific embodiment, the heated liquid in the tank is maintained at less than the temperature required for liquid to gas phase conversion (i.e. 212° F. when water is used as the hot liquid), as this will produce steam which is less effective for fire ant treatment. The injector component may include a conduit with an elongated body having a distal end and a proximal end. The hose engages to the proximal end of the conduit and the hot liquid is applied to the target location out the distal end.

In a specific embodiment, the conduit is rigid and/or comprised of metal. The conduit may possess dimensions that make it particularly suitable for injection into ant mounds that extend from the surface downward into the soil. In a more specific embodiment, the conduit comprises a length of pipe (about 2-6 feet) and comprises a channel 0.5-2.5 inches in diameter. The conduit may be tapered at the distal end to facilitate injection into the ground. Typically, the conduit delivers the hot liquid out the distal end opening and does not include any side ports along the side of the conduit for radial delivery of liquid. Alternatively, the conduit includes side ports along a portion of the conduit in conjunction with the distal opening for collinear and radial delivery of the heated liquid. In a more specific embodiment, the conduit has side ports along the elongated body proximate to the distal end (e.g. within about 1 foot from the distal end).

In one specific embodiment, the injector component is configured to deliver hot liquid from the bottom of the target location upward. This encourages improved control of the heated liquid and minimize excessive overflow from the target area, which may damage surrounding foliage, grass or landscaping. Thus, placement of the distal end of the injector component proximal to the bottom of an ant colony such that hot liquid is dispensed provides maximal spread of the hot liquid in the colony and achieves effective killing of ants while minimizing overflow of the hot liquid into the surrounding environment.

Embodiments described herein make possible the control of fire ant and other pest species at the scale of hectares, without the use of pesticides. This system may be sized depending on large or small scale applications. Disclosed embodiments provide an alternative to all forms of chemical mound treatments and/or broadcast chemical baits for fire ant control in areas unsuitable for pesticide application or where immediate control is desirable.

In a further embodiment, the tank, heating component, and pump are assembled onto a vehicle or trailer to provide easy transport and to facilitate treatment in remote areas where power and water are not readily available. In a specific embodiment, the tank holds 200 gallons of liquid or more, and the tank, pump, and heating component are assembled on a frame having wheels with a hitch for attachment to a motor vehicle.

In an alternative embodiment, the pump, tank, and heating component are assembled into a unit that comprises shoulder strap(s) or harness to carry the system over the shoulders of the user. This would typically be a system adapted for small-scale and residential use.

The system may further comprise a power unit to deliver power to the pump and the heating component. Typically, the power unit is a fuel-powered motor. In a more specific embodiment, the fuel-powered motor is a diesel motor. The heating unit typically operates as a fuel burner that uses the heat generated to heat a coil that comes into contact with the liquid flowing through the system.

In one embodiment, the heater component includes a reservoir to store a volume of heated liquid delivered from the tank. As heated liquid is ejected, the tank delivers additional liquid to keep the reservoir at a steady level of hot liquid. Alternatively, liquid may be cycled through the heating component and the tank so that the tank holds the volume of heated liquid for treatment. In a specific embodiment, the fluid is provided "on demand" that heats the liquid, as needed, as it flows through the heating unit and then directly to the insulated hose and out through the injector component.

In certain embodiments, the heating component may take the form of a heat pump, electric coil, infra-red, or ignitable gas (propane, butane, natural gas, etc.) heating element. In any configuration, the system will include a thermostat to monitor the temperature of the liquid and the system configured to control heat such that ejected liquid is made as hot as possible but without changing state to gas.

Also disclosed is a method for controlling a population of insects that involves inserting an injector component into a mound or nest harboring the population and delivering hot liquid in an amount and at a temperature sufficient to kill the population. It is contemplated that some insects of the population may live but the survivors are not capable of reviving the population and will ultimately die. The liquid administered is typically 150° F. or more. The higher the temperature the less amount of liquid is needed for adequate killing.

In a specific embodiment, the population is a colony of fire-ants. According to this embodiment, the conduit is inserted approximately in the center of the mound and is delivered approximately 2-6 feet below the surface of the mound depending on the size of the colony. The user will be able to determine appropriate depth of the conduit based on resistance in the soil. The architecture of fire-ant mounds is such that the center is soft and the soil becomes more firm at the bottom edge of the colony. There is no standard volume of liquid applied, although it typically requires at least 10 gallons of water to kill a medium or large fire ant colony.

Figure 1:
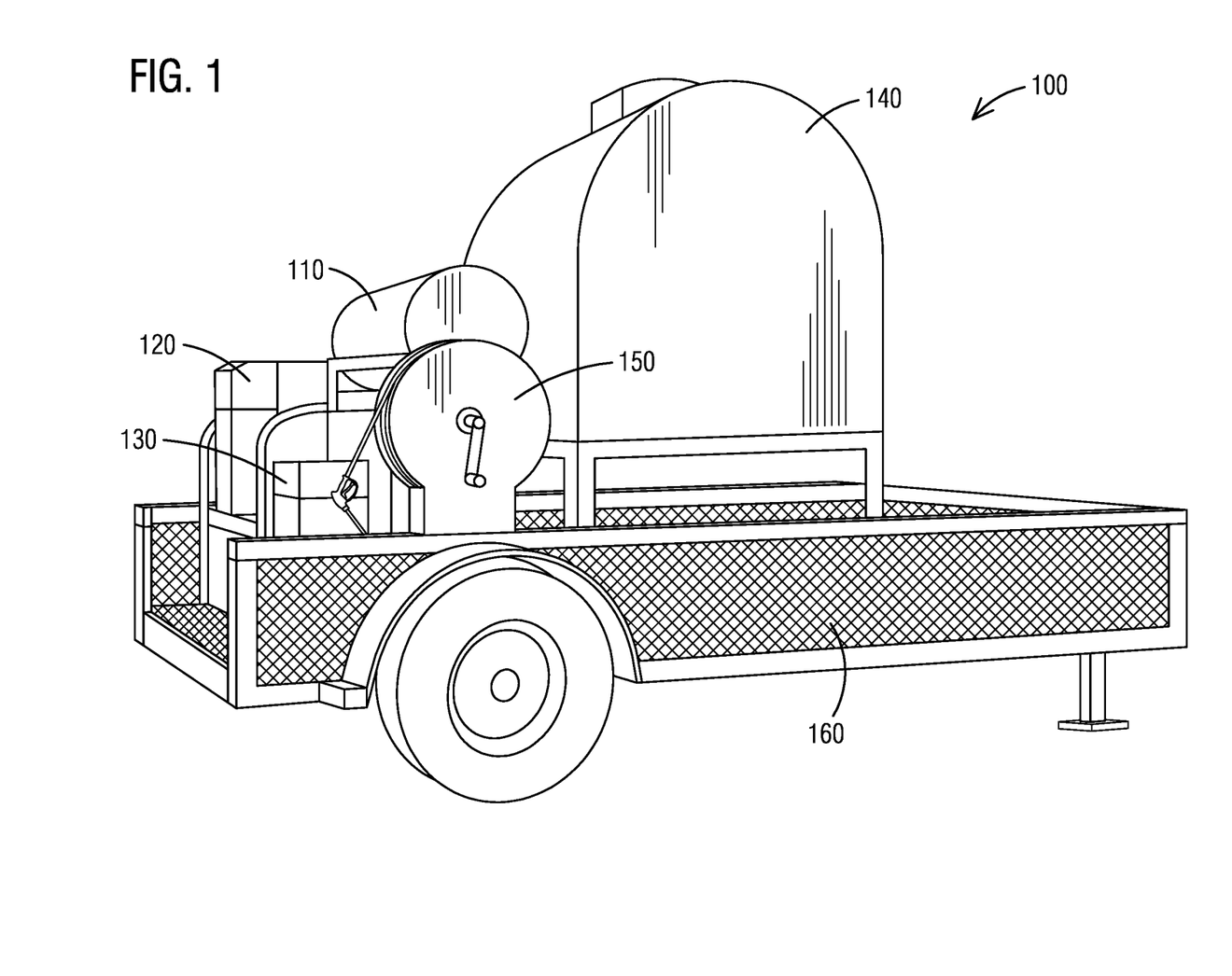
FIG. 1 shows a side view of a trailer-based, on demand hot liquid heating system embodiment.

Turning to the drawings, FIG. 1 shows a system 100 comprising a liquid tank 140, a motor 120 that powers the pumping system 130, a pump, a diesel-fired liquid heating unit 110, and a hose reel 150. The liquid tank 140, motor 120, heating unit 110 hose reel 150 are provided on a trailer 160. The components of the system 100 work together to provide a portable, self sufficient hot liquid system adapted for insect control, without the need for on-site power. The system 100 is especially tailored for agricultural or industrial use. Based on the teachings herein, one skilled in the art would recognize that the components of the system could be miniaturized for smaller applications and residential use. For example, the components could be positioned on a small dolly or even on a back pack harness for carrying over the users shoulders.

Figure 2:
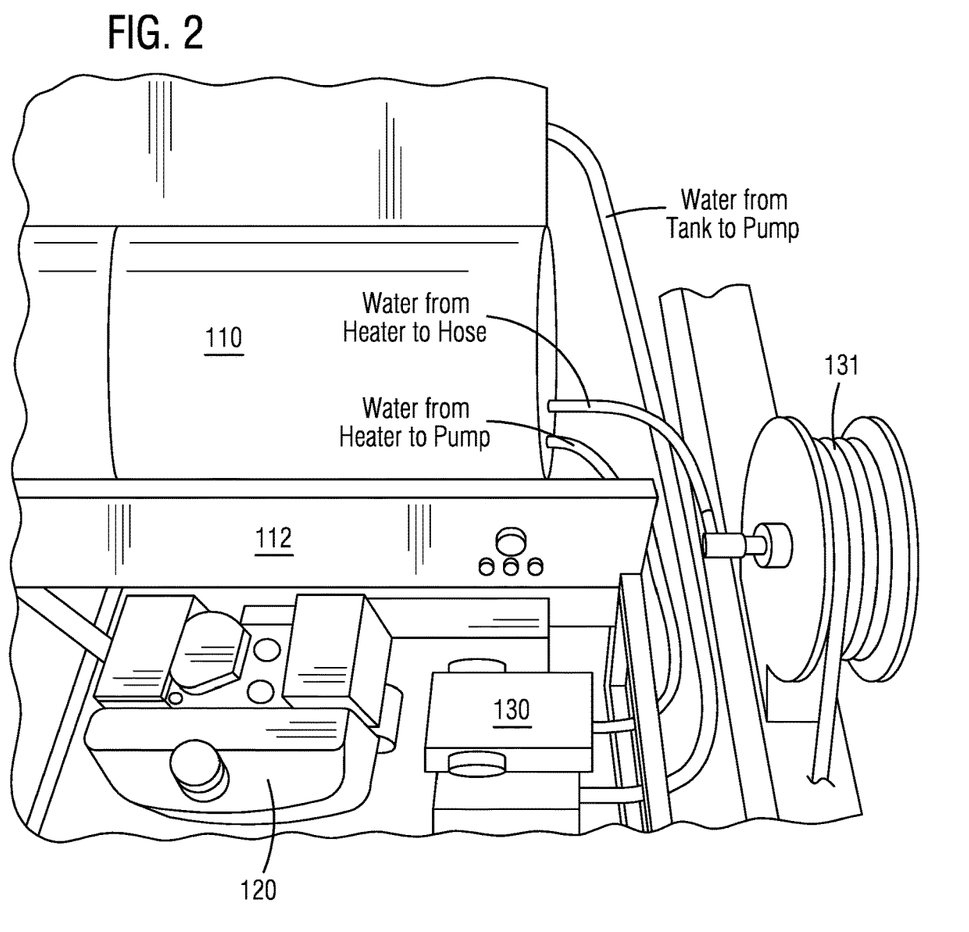
FIG. 2 shows side close up view of the liquid pumping and heating subsystems noted in FIG. 1.

FIG. 2 shows side close up view of the liquid pumping and heating subsystems shown in FIG. 1. Liquid flows from the liquid tank (140, FIG. 1) to the pump 130. As shown, the pump is run by a chain or belt drive powered by the diesel motor 120 but other power generation for driving the pump could be used instead. The liquid flows through the pump and is pressurized, flowing then to the heating unit 110. The heating unit is powered by a burner (111, FIG. 3) that heats a coil (not shown) that transfers heat to the liquid flowing through it. The temperature of the liquid is under thermostatic control 112 by the operator. Once heated, the liquid flows out of the heater unit 110 to an insulated hose 131 (typically at least 100 feet in length) with a wand (see FIG. 3) attached to insulated hose 131, to allow application of the liquid away from the trailer. The wand serves as the injector component for administration of hot liquid to a fire-ant colony.

Figure 3A:
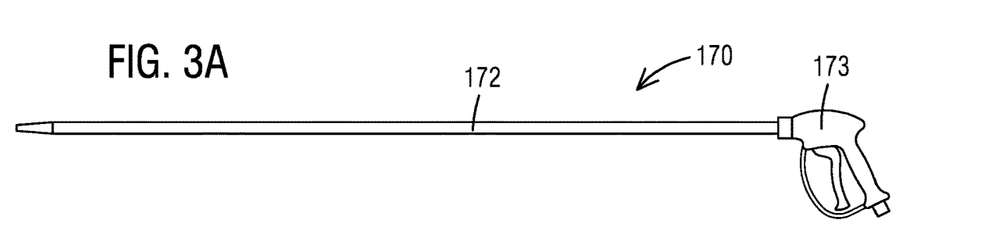
FIG. 3 shows a side view A. and end perspective view B. of a wand system embodiment designed to deliver hot liquid below ground.
Figure 3B:
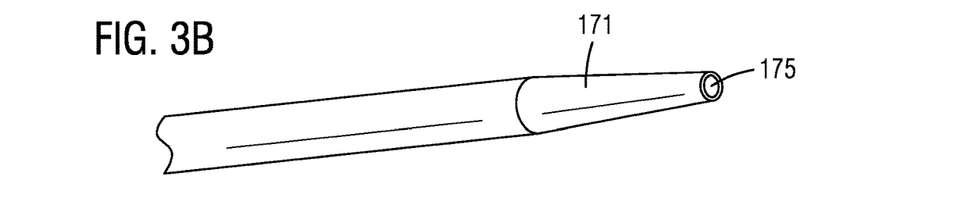

FIG. 3 shows a wand system embodiment 170 useful as an injector component to deliver hot liquid below ground. The system 170 comprises an elongated wand body 172 and an actuation mechanism 173 to control liquid flow (on-off). In a specific embodiment, the wand is made of a rigid material such as metal, plastic, and the like. As shown, the wand body 172 is a long steel wand of at least 3-4 feet that can be driven underground to deliver liquid at a depth of up to 4 feet. In this particular configuration the wand comprises a distal end 171 that has a tapered end with one opening 175 at the tip to deliver liquid. Those skilled in the art will recognize that the distal end may take other configurations and may comprise more than one opening at or proximate (up to 4, 5, 6, 12, 15, 20, or 24 inches) from the tip 171. The tip 171 is not necessarily tapered, but the taper assists in driving the wand into the ground.

Figure 4A:
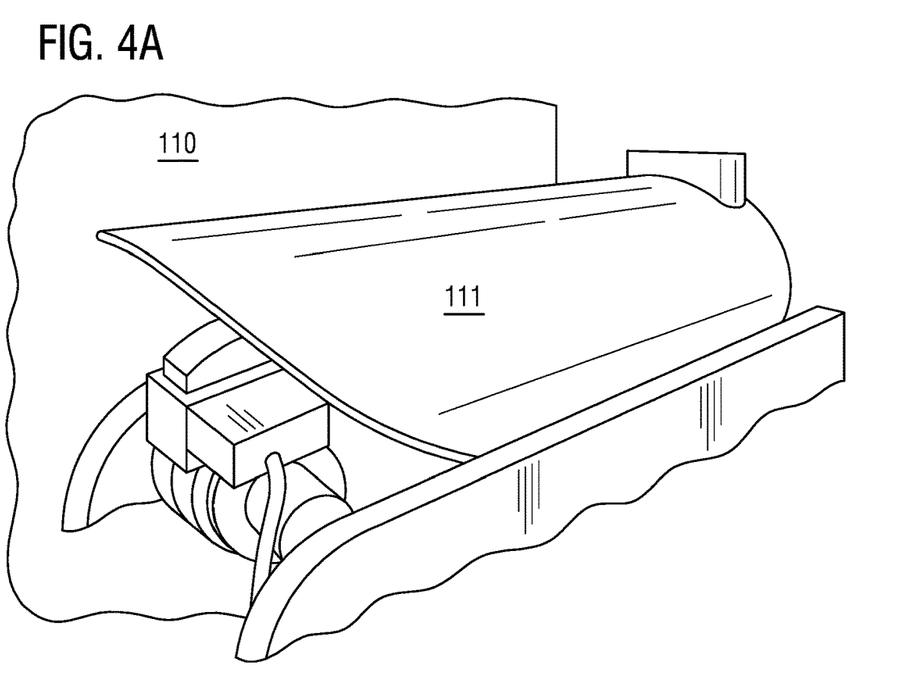
FIG. 4. shows a side perspective view A. and end view B of a burner embodiment that heats the heating component of the system.
Figure 4B:
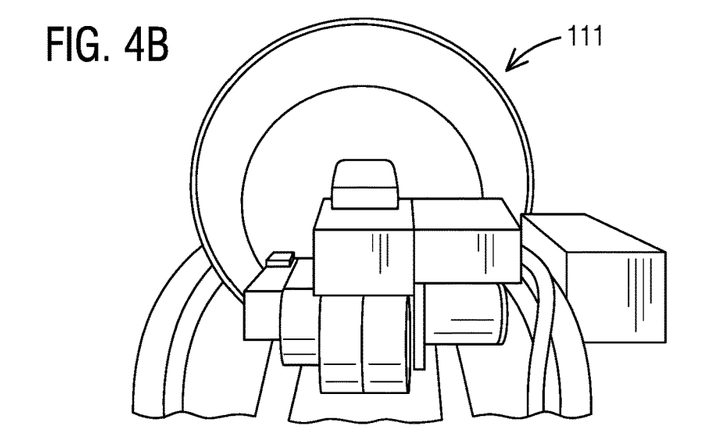

FIG. 4 shows an example of a burner 111 that can be used in the heat unit 110. As shown, the burner is a fuel powered heater (diesel-fired) that heats the heating component of the system. Those skilled in the art will appreciate that the burner may take other forms that work mechanically without the need for fuel firing, such as a heat pump system containing a liquid energy transfer means (that could be powered by motor).

Figure 5:
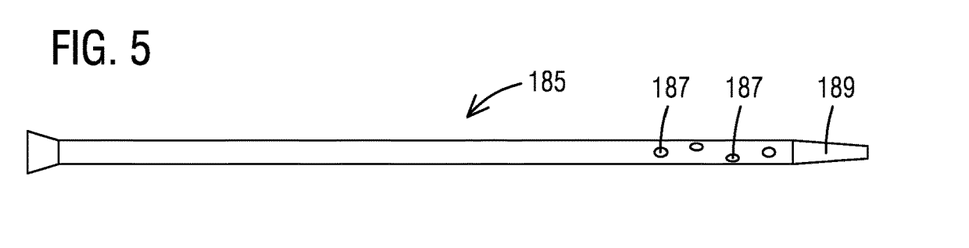
FIG. 5 shows a side view of a wand embodiment for use in accord with the teachings herein.

FIG. 5 shows a side view of an alternative fluid delivery wand 185 that has side holes 187 provided proximal to the distal end 189 of the wand 185. This alternative embodiment allows for lateral delivery of hot liquid once in the proper depth of a fire-ant colony. The holes are typically within about 1-2 feet from the distal end 189.

Figure 6:
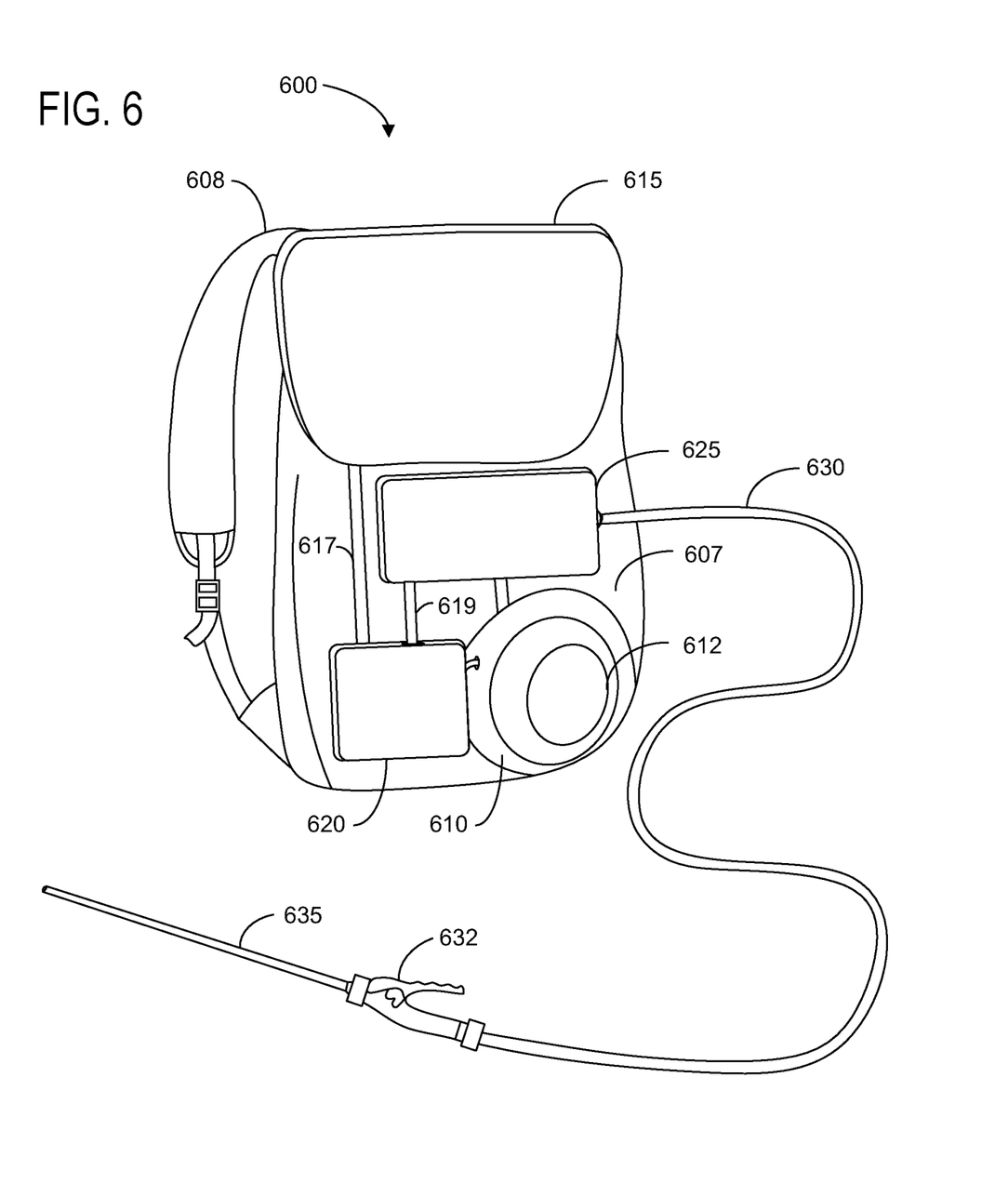
FIG. 6 shows a side perspective view of a portable hot liquid delivery system embodiment.

FIG. 6 shows a hot-liquid production and delivery system 600 that is designed for personal carrying by an operator. The system 600 has a frame base 607 onto which various components of the system are engaged. The system 600 includes shoulder straps 608 that allows the user to wear the system during transport or operation. Mounted to the base 607 is a motor that includes a fuel tank 612. The components of the system can be arranged at any suitable location on the system 600. The system also includes a pump 610, in fluid communication with a liquid tank 615 via fluid line 617. The pump 620 pumps liquid from the liquid tank 615 to the heating unit 625 via fluid line 619. Heated liquid is transferred from the heating unit 625 to a hose 630 which delivers heated liquid to the wand 635. The wand 625 serves as an injector component of hot liquid to an insect colony. Hot liquid delivery may be controlled by an actuation mechanism 632. The system 600 may further comprise an auxiliary fuel tank to serve as fuel source for the heating unit 625. The motor 610 may electrically or mechanically linked to pump and/or heating unit. In an alternative embodiment, the system 600 includes an auxiliary motor to provide energy to the heating unit 625. In view of the teachings herein, it will be understood that the components of the system 600 may be combined or engaged together in alternative configurations than that shown in FIG. 6 so long as the functional objectives of system 600 (heating and transfer of hot liquid) are maintained.

It will also be understood that energy used by the system may be a battery source and not an ignitable fuel source.

In another alternative embodiment, a portable hot liquid system comprises a burner unit (typically powered by a hydrocarbon fuel such as gas, diesel, propane or butane) and an insulated tank. This system may include a frame base onto which the tank and burner unit are engaged and arranged such that heat transfer occurs between the burner unit and the tank. The frame may include shoulder strap(s) or a harness to allow the operator to wear the system on their body. This alternative embodiment may further include a hose that is in fluid communication with the liquid tank. The hose may also have an injector component associated therewith at the opposite end. This alternative embodiment provides a more simple arrangement that alleviates the need for a motor. A valve may be associated with the hose, tank, or injector component which will allow hot liquid to flow upon actuation. Since the tank is being worn above ground, liquid will be gravity driven into the target location. Alternatively, this alternative embodiment can include one or more of the components described and shown for FIG. 6.

Example 1: Treatment of Fire Ant Colonies to Prevent Sea Turtle Death

Test Results

In Florida, there has been an observed problem of sea turtle hatchling kills by *Solenopsis invicta*, red imported fire ants (RIFA). Over the sea turtle nesting and hatching summer period of 2013 at Fort De Soto Park, there were 12 turtle nests (out of 66 nests on the beach over the entire season) affected by fire ant predation, with 412 hatchlings killed. In 2014, there were 12 turtle nests affected (out of 104) with a total of 126 hatchlings killed. In 2014, the mortality of hatchlings caused by fire ant predation was lower because park staff watched nests more closely and intervened (recovered hatchlings and eggs) if fire ants were detected entering nests. The increased intervention (entering the nests before the protocol of 72 hours) raised concern from FFWCC and was the basis for pursuing the sea turtle license plate fund emergency funds to support reduction of fire ant populations on Fort De Soto Park as clearly, fire ants continued to be a major predation threat to the sea turtles, despite staff efforts to mitigate the loss of hatchlings.

Beginning in April, 2015, standard survey methods (baiting and visual searching) were used to catalogue the presence of fire ants (and other ants) along beaches and, with emphasis on detecting colonies within ~10 m radius around sea turtle nests as they were laid by females over the course of the nesting season. Beginning in June and continuing through early September, the hot water administration method was implemented to kill any fire ant colonies detected within ~10 m of sea turtle nests. Over the sea turtle nesting and hatching summer period of 2015 at Fort De Soto Park, 4 nests had a total of 36 sea turtle hatchlings dead, with a total of 80 nests. 52 fire ant colonies were treated with the hot water removal method, resulting in fire ant removal in the vicinity of 14 different turtle nests, with an average of nearly 4 fire ant colonies removed from the vicinity of each affected turtle nest. Three of the four nests with dead hatchlings killed by fire ants were not treated for fire ants as no fire ant colony was detected in the vicinity of the turtle nest. For the fourth affected turtle nest, 3 colonies were removed but 10 hatchlings were still killed by fire ants, although 60 survived.

Thus, in sum, of 14 turtle nests that had fire colonies removed from the vicinity, only 1 nest still had fire ants prey upon turtle hatchlings and in that nest 10 hatchlings were killed but 60 survived. Thus, for 2015, this represents a 67% reduction in the number of fire ant predated sea turtle nests, 91% fewer sea turtle hatchlings killed compared to 2013, and 71% fewer sea turtle hatchlings killed by fire ants compared to 2014. These results strongly suggest that this approach to reducing fire ant populations in proximity to sea turtle nests can greatly reduce fire ant predation on sea turtle hatchlings. The protocol could likely be improved by incorporating greater effort in detecting and treating fire ant colonies (especially smaller colonies) established near sea turtle nests.

Example 2: Efficacy of Hot Water Fire Ant Treatment

Discussion

RIFAs are a species of medical, economic, and agricultural concern, and thus the presence of even a single colony can be justification for pursuing control (Drees et al. 2013). Given this low actionable threshold for treating individual mounds and the widespread use of pyrethroid, carbamate, and organophosphate contact insecticides as the primary mound-control method, there is a need to find a non-toxic alternative that provides comparable levels of control and rapid elimination of individual mounds (Drees 2003, Drees et al. 2013). As the use of broadcast baits is not recommended below densities of 20 mounds per hectare (Drees 2003), and none of the recommended treatments should be used in close proximity to bodies of water, mound treatments may be favored for control of RIFA in residential settings. However, extensive use of contact insecticides for RIFA mound treatments has serious environmental impacts because mound treatments contain much greater concentrations of active insecticidal ingredients. For example, when used extensively environmental impacts have resulted, including documented cases of pollution of numerous bodies of water in urban and suburban areas of Texas (Drees 2003). The area under Federal RIFA quarantine includes 14 US states (primarily in the southeastern US) and one territory (Puerto Rico), and a broad variety of industries depend upon reliable control of fire ant populations to comply with quarantine (USDA 2012). In addition to the general public that the pest control industry serves, plant nurseries, the grass and sod industry, and numerous agricultural interests (e.g. hay, citrus, cattle growers) are all stakeholders with an interest in effective alternatives to chemical control of fire ants.

There are a variety of circumstances where frequent application of insecticides is not desirable or possible, such as in school yards, some athletic fields, in the yards of homeowners (or their pets) with pesticide sensitivities, golf courses near bodies of water, wildlife conservation areas where pesticide application is strictly forbidden, and in many agricultural settings (Drees and Gold 2003, Green and Gouge 2008, Drees et al. 2013). This is especially true for individual mound treatments that require the use of higher doses of insecticides (relative to broadcast baits) and are typically more costly than broadcast baits, especially if numerous mounds are treated. In sum, the pest control industry would benefit enormously from a cost-effective, non-toxic alternative to chemical control of fire ants and other ground-dwelling pest arthropods. Ideally, this alternative control approach would serve as a viable alternative to contact insecticide mound treatments and would be integrated directly into existing IPM plans that utilize broadcast baits and a mound treatment as a "two step" approach (Drees and Gold 2003, Green and Gouge 2008).

While there has been discussion in the prior art regarding the use of hot water to kill fire ants (Tschinkel 2006), application methods of hot water have been cumbersome and potentially unsafe. Tshinkel and King (Tschinkel 2006) describe a fire driven kiln and pump system which provides hot water to buckets. However, this system has several drawbacks, including potential for explosion or burns associated with handling and pouring buckets. Also, the system does not provide a means for precise delivery down into all levels of the ant colony, which can result insufficient fire ant kills and recolonization.

that sites left untreated will be recolonized (Drees and Gold 2003, Tschinkel 2006). Thus, this requires frequent reapplication of insecticides if chemical controls are used. The season that insecticides are applied can affect efficacy of chemical controls (Collins et al. 1992), often resulting in a need to reapply 2-3 times per year. Annual reapplication, 2-3 times per year, of insecticides thus increases the amount of pesticide released into the environment, perpetuates non-target effects such as death of non-target ants and other animals especially if water is nearby (Tschinkel 2006, McNaught et al. 2014), and potentially reduced efficacy of the insecticide for control of fire ants. Fire ant populations repeatedly exposed to broadcast baits may demonstrate "bait-shyness," a behavior where foragers will no longer pick up bait, and thus baiting can become less effective over time if used frequently (Tschinkel 2006). Hot water thus offers an entirely non-toxic approach to control with no non-target impacts, with comparable levels of control to insecticidal approaches, that can be employed year round and in any environment where fire ants control is desirable.

TABLE 1

Reported results of fire ant control studies using different methods of control.

| Study | Control method | Environment | Plot size | Study duration | Average number of mounds pre-treatment | Average number of mounds post-treatment | Maximum reported % reduction |
|---|---|---|---|---|---|---|---|
| King (2016, unpublished) | hot water | beaches (USA) | 10 m × 10 m | 5 months | 4 | 0 | 100 |
| McNaught et al. (2014) | methoprene*, pyriproxyfen*, hydramethylnon** | suburban areas (Australia) | various | 11 months | 22-5059 ha$^{-1}$ | 0 | 100 |
| Cook (2003) | methoprene*, hydramethylnon** | savanna/forest (USA) | 2 ha | 36 months | 45 | 3 | 93 |
| Collins et al. (1992) | fenoxycarb*, hydramethylnon** | pasture (USA) | 0.4 ha | 12 months | not reported | not reported | 95-98 |
| Barr et al. (2005) | various contact insecticides, toxicants, and growth regulators | not reported (USA) | not reported | 8 months | 25 | 1-6 | 76-96 |

*insect growth regulators, disrupts metamorphosis, active ingredients in a variety of broadcast baits including Logic ™ and Extinguish ™
**metabolic inhibitor, disrupts cellular respiration, active ingredient in the broadcast bait Amdro ™

The use of hot water by homeowners, agricultural interests and the pest control industry is limited by the large volume of near-boiling water (~85° C.) required to kill an individual mound (often in excess of 5 gallons) and the difficulty and safety concerns in moving and applying enough hot water to control numerous mounds spread across the landscape. This issue is addressed by embodiments described herein which are adapted for the portable and remote delivery of hot water at temperatures prescribed for killing ants. Further, embodiments herein provide a more precise, safe and contained application of hot water. Table 1 summarizes the efficacy of hot water as a fire ant control method relative to a number of published studies that have utilized a variety of chemical control approaches in different environments. The control rates (reduction of the number of mounds in an area) accomplished using hot water are equivalent to control rates accomplished using insecticides, including various toxicants and growth regulators applied as broadcast baits and contact insecticides applied directly to mounds (Table 1).

It is important to note that all control methods require regular site visits and application of the control method as the presence of fire ants throughout the landscape assures

REFERENCES

Ascunce M S, Yang C C, Oakley J, Calcaterra L, Wu W J, Shih C J, Goudet J, Ross K G, Shoemaker D (2011) Global invasion history of the fire ant Solenopsis invicta. Science 331: 1066-1068.

Barr C L, Davis T, Flanders K, Smith W, Hooper-Bui L, Koehler P, Gardner W, Drees B M, Fuchs T W (2005) Broadcast baits for fire ant control. Southern Region IPM Center and Texas Cooperative Extension, 12 pp.

Collins H L, Callcott A, Lockley T C, Ladner A (1992) Seasonal trends in effectiveness of hydramethylnon (AMDRO) and Fenoxycarb (LOGIC) for control of red imported fire ants (Hymenoptera: Formicidae). Journal of Economic Entomology 85: 2131-2137.

Cook, J L (2003) Conservation of biodiversity in an area impacted by the red imported fire ant, Solenopsis invicta (Hymenoptera: Formicidae). Biodiversity and Conservation 12:187-195.

Drees B M (2003) Estimated amounts of insecticide ingredients used for imported fireant control using various treatment approaches. Fire Ant Plan Fact Sheet FAPFSO42. *Texas Imported Fire Ant Research & Management Project*, Texas A&M University System, College Station, Tex., 11 pp.

Drees B M, Calixto A A, Nester P R (2013) Integrated pest management concepts for red imported fire ants *Solenopsis invicta* (Hymenoptera: Formicidae). *Insect Science* 20: 429-438.

Drees B M, Gold R E (2003) Develpoment of integrated pest management programs for the red imported fire ant (Hymenoptera: Formicidae). *Journal of Entomological Science* 38: 170-180.

Green T A, Gouge D H, eds (2008) School IPM 2015: A Strategic Plan for Integrated Pest Management in Schools in the United States. 286 pp.

Hamman P J, Drees B M, Vinson S B (1986) Fire ants and their control. Texas Agricultural Extension Service, Texas A&M University, College Station, Tex. B-1536. 12 pp.

King J R (2016) A rapid, non-toxic system for control of fire ants along Florida beaches with a special emphasis on Fort De Soto Park, Pinellas County, Fla. Final Programmatic Report: Sea Turtle License Plate Grants Emergency Funds.

King J R, Tschinkel W R (2006) Experimental evidence that the introduced fire ant, *Solenopsis invicta*, does not competitively suppress co-occurring ants in a disturbed habitat. Journal of Animal Ecology 75: 1370-1378.

Lard C F, Willis D B, Salin V, Robison S, Schroeder K, Hill B, Jordon J (2001) The statewide economic impact of the red imported fire ant in Texas. Department of Agricultural Economics, Texas A&M University, College Station, Tex.

Lard C F, Willis D B, Salin V, Robison S (2002) Economic assessment of red imported fire ant in Texas. In Program highlights of the Texas Imported Fire Ant Research and Management Project. Drees B M, ed. *Southwester Entomologist Supplement No.* 25: 123-1372.

McNaught M K, F R Wylie, E J Harris, C L Alston (2014) Effect of broadcast baiting on abundance patterns of red imported fire ants (Hymenoptera: Formicidae) and key local ant genera at long-term monitoring sites in Brisbane, Australia 107: 1307-1315.

Meighan T (2000) A Scripps Howard Texas Poll (March 2000) conducted by the Texas Imported Fire Ant Research and Management Plan. Available at http://fireant.tamu.edu/materials/newsletters/fa_trails/2000/html/FATRAILS3.005.htm.

Morrison L W, Porter S D (2005) Testing for population-level impacts of introduced *Pseudacteon tricuspis* flies, phorid parasitoids of *Solenopsis invicta* fire ants. *Biological Control* 33: 9-19.

Pimentel D, Zuniga R, Morrison D (2005) Update on the environmental and economic costs associated with alien-invasive species in the United States. *Ecological Economics* 52: 273-288.

Porter S D, Fowler H G, Mackay W P (1992) Fire ant mound densities in the United States and Brazil (Hymenoptera: Formicidae). *Journal of Economic Entomology* 85: 1154-1161.

Stimac J L, Alves S B (1994) Ecology and biological control of fire ants. In: Rosen D, Bennett F D, Capinera J L, eds. *Pest Management in the subtropics: Biological Control—A Florida Perspective*, Intercept, Andover, UK, pp. 353-380.

Tschinkel W R (2006) *The Fire Ants*, Belknap/Harvard University Press, Cambridge, Mass. USA.

Tschinkel W R, Howard D F (1980) A simple, non-toxic home remedy against fire ants. Journal of the Georgia Entomological Society 15: 102-105.

Tschinkel W R, King J R (2007) Targeted removal of ant colonies in ecological experiments using hot water. Journal of Insect Science 7: 41.

United States Department of Agriculture (2012) Pesticide use in the imported fire ant program, Environmental Assessment March 2012. 61 pp.

It should be borne in mind that all patents, patent applications, patent publications, technical publications, scientific publications, and other references referenced herein are hereby incorporated by reference in this application in order to more fully describe the state of the art to which the present invention pertains.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the preceding definitions are provided.

While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, any means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

What is claimed is:

1. An insect control system that comprises
a tank for holding an amount of liquid,
a heating component in fluid communication with the tank,
a pump connected to the tank and the heating component that pumps liquid from the tank to the heating component such that the liquid is heated to become heated liquid;
a hose in fluid communication with the heating component,
an injector component connected to the hose, the injector component comprising a conduit with an elongated body having a distal end and a proximal end, wherein the conduit comprises a pipe of about 2 feet to 6 feet, a channel of about 0.5-2.5 inches in diameter, and a distal opening at the distal end such that delivery of the heated liquid consists of delivery colinear with a central axis of the channel, and
a thermostat component that is configured for controlling heating of the liquid in the heating component at 167 to 198° F., wherein the system provides hot liquid for application to a target insect location.

2. The system of claim 1, further comprising an actuator associated with the injector component to control release of the heated liquid through the injector component.

3. The system of claim 1, wherein the conduit is rigid and comprised of metal.

4. The system of claim 1, wherein the conduit is tapered at the distal end to facilitate insertion into the target insect location.

5. The system of claim 1, wherein the tank, heating component, and pump are assembled onto a vehicle or trailer to provide easy transport and to facilitate treatment in remote areas where power and liquid are not readily available.

6. The system of claim 1, wherein the tank holds 200 gallons of liquid or more.

7. The system of claim 1, wherein the pump, tank, and heating component are assembled into a unit that comprises shoulder strap(s) or harness to carry the system over the shoulders of the user.

8. The system of claim 1, further comprising a power unit to deliver power to the pump and the heating component.

9. The system of claim 8, wherein the power unit is a fuel-powered motor.

10. The system of claim 1, wherein the heating component is a fuel burner that heats a transfer unit that comes into contact with the liquid flowing through the system.

11. The system of claim 10, wherein the liquid is provided, as needed, and flows through the heating component and then directly to the hose and out through the injector component.

* * * * *